(12) United States Patent
Vardimon et al.

(10) Patent No.: US 12,062,250 B2
(45) Date of Patent: Aug. 13, 2024

(54) FACE FEATURES MATCHING BASED TRACKER

(71) Applicant: CORSIGHT .AI, Tel Aviv (IL)

(72) Inventors: Ran Vardimon, Tel Aviv (IL); Keren-Or Curtis, Rishon LeTsiyon (IL); Matan Noga, Tel Aviv (IL)

(73) Assignee: CORSIGHT AI LTD., Tel Aviv (IL)

( * ) Notice: Subject to any disclaimer, the term of this patent is extended or adjusted under 35 U.S.C. 154(b) by 402 days.

(21) Appl. No.: 17/447,055

(22) Filed: Sep. 7, 2021

(65) Prior Publication Data

US 2022/0075997 A1 Mar. 10, 2022

Related U.S. Application Data

(60) Provisional application No. 63/075,246, filed on Sep. 7, 2020.

(51) Int. Cl.
| | |
|---|---|
| *G06K 9/36* | (2006.01) |
| *G06F 18/22* | (2023.01) |
| *G06K 9/62* | (2022.01) |
| *G06V 20/40* | (2022.01) |
| *G06V 40/16* | (2022.01) |

(52) U.S. Cl.
CPC ............ *G06V 40/172* (2022.01); *G06F 18/22* (2023.01); *G06V 20/46* (2022.01); *G06V 40/168* (2022.01)

(58) Field of Classification Search
CPC .................................................... G06V 40/173
See application file for complete search history.

(56) References Cited

U.S. PATENT DOCUMENTS

| | | | | |
|---|---|---|---|---|
| 8,238,617 | B2 * | 8/2012 | Omoto .................... | B60R 25/25 701/1 |
| 8,254,633 | B1 * | 8/2012 | Moon .................... | G06V 20/52 382/118 |
| 11,216,645 | B2 * | 1/2022 | Yu ........................ | G06V 40/168 |
| 2013/0266181 | A1 * | 10/2013 | Brewer ................ | G06V 40/173 382/103 |

\* cited by examiner

*Primary Examiner* — Brian Werner
(74) *Attorney, Agent, or Firm* — Reches Patents

(57) ABSTRACT

Systems, and method and computer readable media that store instructions for features matching based tracker.

17 Claims, 3 Drawing Sheets

FACE FEATURES MATCHING BASED TRACKER

BACKGROUND

There is a growing need to track after appearances of persons in video streams. A typical solution processes one frame at a time—trying to find at the frame a set of pixels that will match a reference signature of a face.

Such tracking is susceptible to changes that may occur between one frame to another such as—changes in illumination conditions, changes in spatial relationship between the face to the image sensor, mixing between adjacent faces, and the like.

There is a growing need to provide a more robust tracking method.

SUMMARY

There may be provided systems, methods and computer readable medium as illustrated in the specification.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
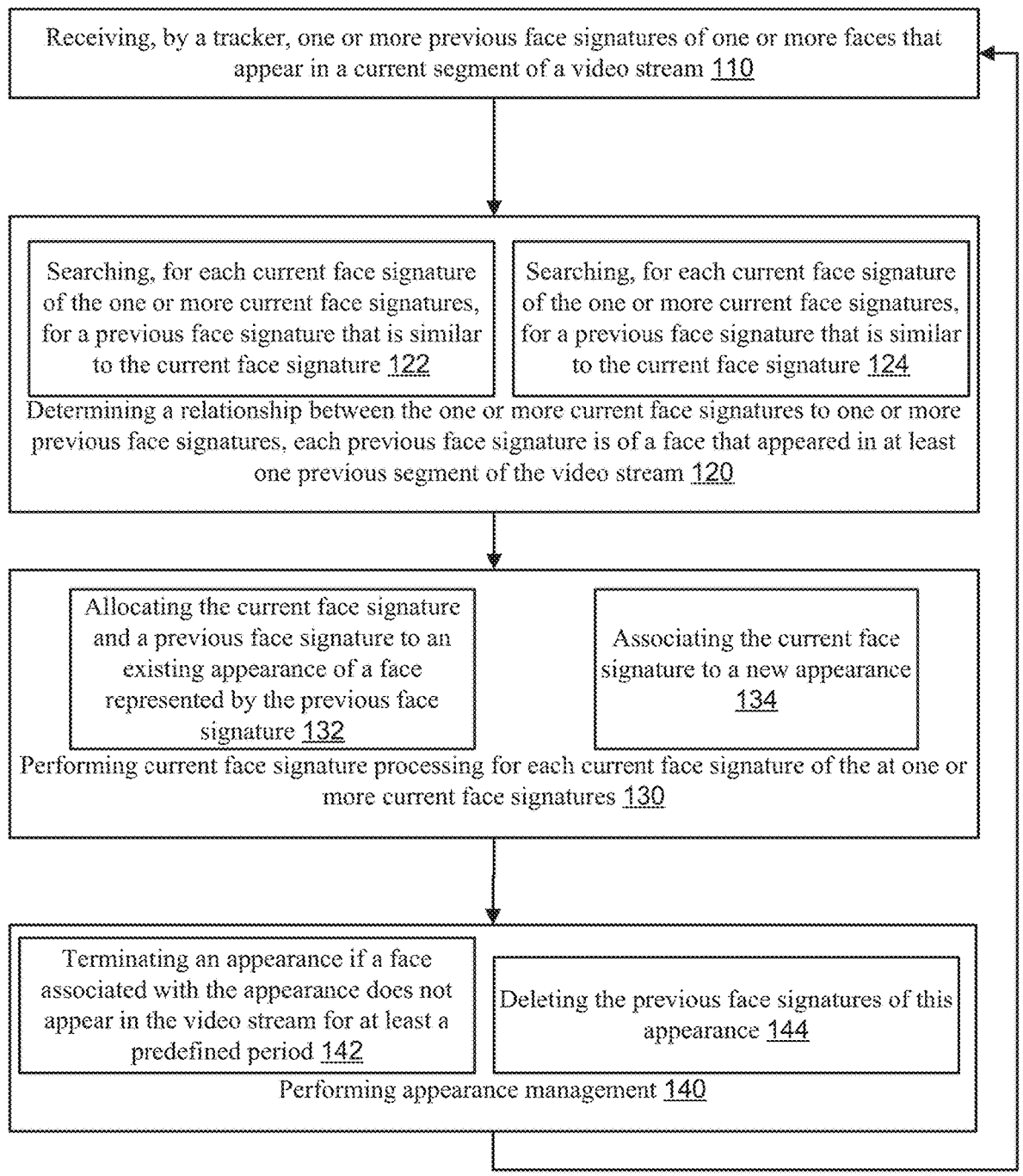
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to an image. An image is an example of a media unit. Any reference to an image may be applied mutatis mutandis to a media unit. A media unit may be an example of sensed information unit. Any reference to a media unit may be applied mutatis mutandis to sensed information. The sensed information may be sensed by any type of sensors—such as a visual light camera, or a sensor that may sense infrared, radar imagery, ultrasound, electro-optics, radiography, LIDAR (light detection and ranging), etc.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

The analysis of content of a media unit may be executed by generating a signature of the media unit and by comparing the signature to reference signatures. The reference signatures may be arranged in one or more concept structures or may be arranged in any other manner. The signatures may be used for object detection or for any other use.

The term "substantially" means insignificant deviation—for example differences that do not exceed few percent of a value, differences that are below the accuracy and/or resolution related to the face recognition process. What is substantially may be defined in any manner.

The term "segments of a video stream" may be one or more frames of the video streams.

There may be provided a matching based tracker for tracking after a face.

There may be provided a method that uses features from a model trained for face recognition, using similarity matching with either embeddings or binarized signatures. The method may use features trained to recognize faces, not just the existence of face (e.g. face detector), this gives an entirely different level of quality for such tracking.

The tracking may be configured to track after a person even when the person changes his appearance during the video. The method may track faces in dense crowds even with head bobbing (queues of people facing the camera).

The tracker may track a person that leaves the field of view of the image sensor (that acquired the video stream) and then re-enters the video frame, or being occluded for some time.

The tracker may avoid confusion between similar looking persons.

An appearance is an ongoing identification of a specific individual in a specific video stream. It may begin once a new face is detected in a frame, and ends if the face did not appear in any following frame for a preconfigured time period (TTL). The appearance may be associated with a sequence of detected faces and their signatures.

It may be beneficial to have a tracker that is dedicated to tracking faces—and may not be configured to track other objects.

It is assumed that face signatures of the same face do not extensively change between adjacent frames.

It is beneficial to apply the tracker on a video stream that is not significantly altered (for example different frames do not undergo different graphic image processing insertion processes).

FIG. 1 illustrates an example of method 100.

Method 100 may start by step 110 of receiving, by a tracker, one or more previous face signatures of one or more faces that appear in a current segment of a video stream.

The current segment may be the first frame of the video, and if so—there may or may not be any previous face signatures.

It is assumed that step 110 includes receiving one or more previous face signatures. This may occur after faces appeared in one or more frames of the video stream and one or more previous face signatures were generated.

Step 110 may be preceded by or may include generating face signatures by a signature generator. The signature generator may differ from the tracker, may be integrated with the tracker, may be implemented by the same processing circuit, may be implemented by a different processing circuit than the signature generator, and the like.

Non-limiting examples of signature generator and searching for similar (for example matching) signatures is illustrated in U.S. patent application Ser. No. 16/544,940 filing date Aug. 20, 2019 which is incorporated herein by reference.

Step 110 may be followed by step 120 of determining a relationship between the one or more current face signatures to one or more previous face signatures, each previous face signature is of a face that appeared in at least one previous segment of the video stream.

The determining may include searching, for each current face signature of the one or more current face signatures, a previous face signature that is similar to the current face signature. One previous face signature may be selected per current face signature—and it may be the most similar previous face signatures.

The determining may include determining that a current face signature does not have any matching previous face signatures.

The determining may include searching for a previous face signature that is similar to a current face signature based on the visual attributes alone (for example based on the signature alone).

Additionally or alternatively—the determining may include searching for a previous face signature that is similar to a current face signature based on the visual attributes alone and at least one additional attribute. The at least one additional attribute may include location of the face and/or time of appearance of the face in the video stream.

Step 120 may include step 122 of searching, for each current face signature of the one or more current face signatures, for a previous face signature that is similar to the current face signature. The similarity is based only on the face signatures. Step 122 may be regarded as a first phase.

Step 120 may include step 124 of searching, for each current face signature of the one or more current face signatures, for a previous face signature that is similar to the current face signature. The similarity is based on the face signatures and on one or more additional attributes. Step 124 may be regarded as a second phase.

Step 124 may include relaxing the similarity threshold—for example allowing less similar face signatures to be regarded as belonging to the same face.

Step 120 may include first applying step 122—and if no similarity signature is found applying step 124—especially with a more relaxed similarity threshold.

The similarity between signatures may be any similarity text—for example overlap between signatures, any distance between signatures, and the like.

Step 120 may be followed by step 130 of performing current face signature processing for each current face signature of the at one or more current face signatures.

For a current face signature that has a similar (especially most similar) previous face signature—step 130 may include step 132 of allocating the current face signature and a previous face signature to an existing appearance of a face represented by the previous face signature.

For a current face signature that does not have a similar previous face signature—step 130 may include step 134 of associating the current face signature to a new appearance.

Step 120 may also be followed by step 140 of performing appearance management.

Step 140 may include step 142 of terminating an appearance if a face associated with the appearance does not appear in the video stream for at least a predefined period. Thus—step 140 may include terminating an appearance if there is a sufficient time gap from a last time in which the face appeared in the video stream.

Step 140 may include step 144 of deleting the previous face signatures of this appearance.

Each face signature (current face signatures, previous face signature) may be associated with a time stamp indicative of a time in which the face appeared in the video stream. Step 140 may determine whether the time gap has lapsed, based, at least in part, on the time stamps.

The method (for example—step 140) may include maintaining up to a predefined number (N1) of face signatures per appearance. For example—the last N1 face signatures.

The method (for example—step 140) may include maintaining per appearance, face signatures associated with the appearance, timing information regarding when a face appeared in the video stream, and an appearance identifier.

Steps 110, 120, 130 and 140 may be repeated for multiple segments of the video stream. Each iteration processes current face signatures of a current segment, and when the iteration ends this current segment becomes a previous segment and the current face signatures become the previous face signatures.

If, for example, a segment is a single frame, then each iteration includes receiving one or more face signatures from this frame (if such exist), and executing steps 120, 130 and 140 in relation to this frame. The next iteration will be applied on face signatures of the next frame.

Figure 2:
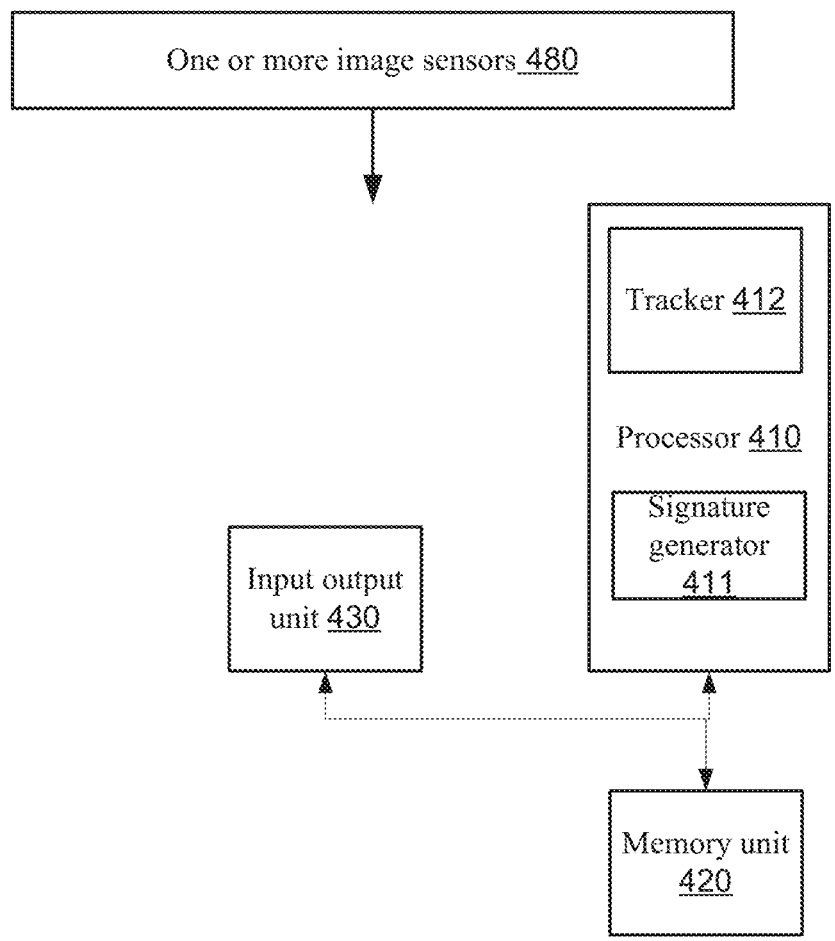
FIG. 2 is an example of a system.

FIG. 2 illustrates an example of a computerized system 400. The computerized system may be configured to execute method 100.

The computerized system may include a processor 410 that may include one or more processing circuits, a memory unit 420 and an input output unit 430. The memory unit 420 is configured to store commands, intermediate data, match results, and the like. The input output unit 430 may receive information and may output information. The processor 410 may be a neural network processor, may implement instructions that once executed perform CNN processing, and the like. The computerized system may be one or more computers, may be located in the cloud, may be located in any place and may be adapted to receive information over any network.

The processor 410 may implement a signature generator 411 and a tracker 412. It should be noted that the tracker 412 and the signature generator may be implemented by different processors. The system 400 may be fed with video streams from one or more image sensors 480. Additional attributes such as location and/or time may be generated by stream 100 or received by system 400. Any method for generating location information and/or timing information may be used.

Figure 3:
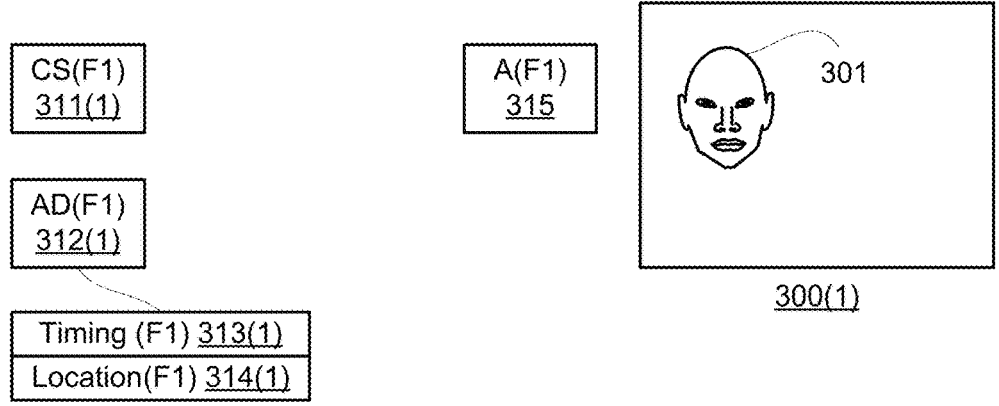
FIG. 3 is an example of images and metadata.
Figure 3:
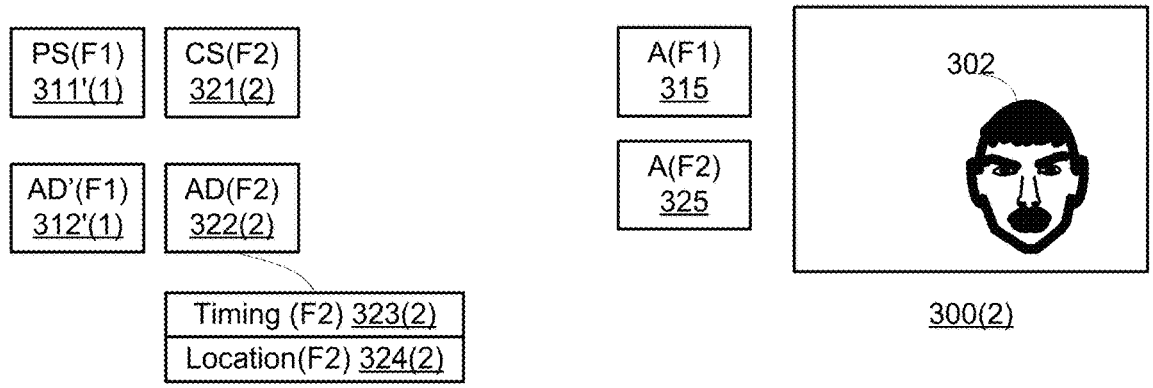
Figure 3:
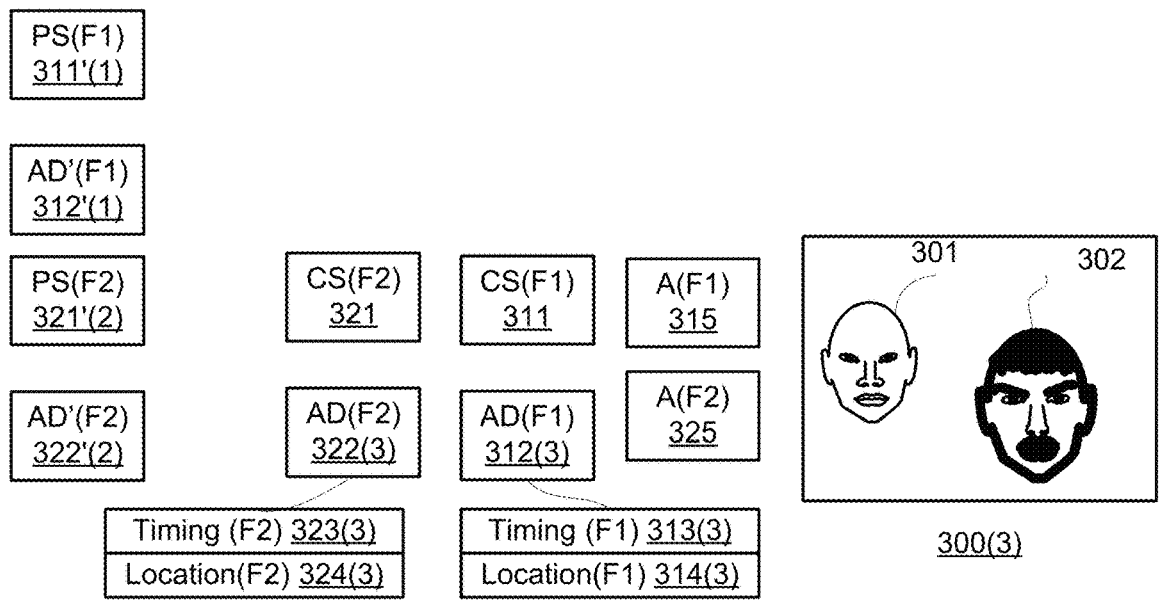

FIG. 3 illustrates various images and metadata.

A first frame 300(1) includes a first face 301.

There are no previous face signatures. The first frame is processed to provide a first current face signature CS(F1) 311(1).

There is a first appearance A(F1) 315.

There are also provided and one or more first additional attributes AD(F1) 312(1) such as Timing(F1) 313(1) indicative of the timing of the first frame, and Location(F1) 314(1) indicative of the location of the first face—for example physical location (street address, GPS coordinates and the like).

A second frame 300(2) includes a second face 302.

There is a previous face signature PS(F1) 311'(1) and previous additional attributes AD'1(F1) 312'(1) generated from the first frame and related to the first face. The second frame is processed to provide a second current face signature CS(F2) 321(2).

There is a first appearance A(F1) 315 and a second appearance A(F2) 325.

There are also provided and one or more second additional attributes AD(F2) 322(2) such as Timing(F2) 323(2) indicative of the timing of the second frame, and Location (F2) 314(2) indicative of the location of the second face—for example physical location (street address, GPS coordinates and the like).

A third frame 300(3) includes the first face 301 and the second face 302. The third frame is processed to provide first current face signature CS(F1) 311(1) a second current face signature CF(F2) 321(2).

There is a first appearance A(F1) 315 and a second appearance A(F2) 325.

There is a previous face signature PS(F1) 311'(1) and previous additional attributes AD' 1(F1) 312'(1) generated from the first frame and related to the first face.

There is a previous face signature PS(F2) 321'(2) and previous additional attributes AD'(F2) 322'(2) generated from the second frame and related to the second face.

There are also provided and one or more first additional attributes AD(F1) 312(3) related to the third frame—such as such as Timing(F1) 313(3) indicative of the timing of the third frame, and Location(F1) 314(3) indicative of the location of the first face.

There are also provided and one or more second additional attributes AD(F2) 322(3) related to the third frame such as Timing(F2) 323(3) indicative of the timing of the third frame, and Location(F2) 324(3) indicative of the location of the second face.

It should be noted that that current face signature CS(F1) 311(1) from frame 3 is similar to previous face signature PS(F1) 311'(1) from frame 1, and that's why face 301 on frame 3 is assigned the same appearance A(F1) 315

The following table illustrates an example of frames, current face signatures (SC(Fx)), previous face signatures (PS(Fx)), open appearances (A(Fx)). Index x represents a face. In the example there are illustrated five faces—first face F1, second face F2, third face—F3, fourth face F4 and fifth face F5.

In the following example an appearance is terminated after two hundred frames in which the face did not appear in a frame. See, for example, the appearance of the third face A(F3) is terminated after two hundred frames (at the 207'th frame) from the last appearance of the face (at the seventh frame). See, for example appearance of the second face A(F2) is terminated after two hundred frames (at the 206'th frame) from the last appearance of the face (at the sixth frame).

TABLE 1

| Frame # | Previous face signatures | Current face signatures | Relevant appearances |
|---|---|---|---|
| 1 | — | CS(F1) | A(F1) |
| 2 | PS(F1) | CS(F1) | A(F1) |
| 3 | PS(F1) | CS(F2), CS(F1) | A(F1), A(F2) |
| 4 | PS(F1), PS(F2) | CS(F2) | A(F1), A(F2) |
| 5 | PS(F1), PS(F2) | CS(F2), CS(F3) | A(F1), A(F2), A(F3) |
| 6 | PS(F1), PS(F2), PS(C3) | CS(F1), CS(F2), CS(F3) | A(F1), A(F2), A(F3) |
| 7 | PS(F1), PS(F2), PS(C3) | CS(F1), CS(F3), CS(F4) | A(F1), A(F2), A(F3) |
| 8 | PS(F1), PS(F2), PS(F3), PS(F4) | CS(F1), CS(F4) | A(F1), A(F2), A(F3), A(F4) |
| 9 | PS(F1), PS(F2), PS(F3), PS(F4) | CS(F1), CS(F4) | A(F1), A(F2), A(F3), A(F4) |
| 10 | PS(F1), PS(F2), PS(F3), PS(F4) | CS(F1), CS(F4) | A(F1), A(F2), A(F3), A(F4) |
| 205 | PS(F1), PS(F2), PS(F3), PS(F4) | CS(F1), | A(F1), A(F2), A(F3), A(F4) |
| 206 | PS(F1), PS(F3), PS(F4) | CS(F1), CS(F5) | A(F1), A(F3), A(F4), A(F5) |
| 207 | PS(F1), PS(F4), PS(F5) | CS(F1), | A(F1), A(F4), A(F5) |
| 208 | PS(F1), PS(F4), PS(F5) | CS(F1), CS(F2) | A(F1), A(F2), A(F4), A(F5) |

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within the same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for face features matching based tracker, the method comprises:

receiving, by a tracker, one or more current face signatures of one or more faces that appear in a current segment of a video stream;

determining a relationship between at least the one or more current face signatures to at least one or more previous face signatures, each previous face signature is of a face that appeared in at least one previous segment of the video stream;

performing current face signature processing for each current face signature of the one or more current face signatures, the current face signature processing comprises:

allocating the current face signature to an existing appearance of a face represented by the previous face signature when the current face signature and the previous face signature are similar to each other; and associating the current face signature to a new appearance when the current face signature is not similar to any of the one or more previous face signatures;

wherein the determining of the relationship comprises:

performing a first phase of determining similarities between a current face signature to the one or more previous face signatures, wherein the first phase comprises applying a first similarity criterion between the current face signature and the one or more previous face signatures;

when no previous face signature of the one or more previous face signature is similar, then performing a second phase of determining similarities between (a) the current face signature and at least one additional attribute associated with the current face signature, and (b) the at least one previous face signatures and at least one additional attribute associated with the at least one previous face signature, wherein the second phase comprises applying a second similarity criterion between the current face signature and the one or more previous face signatures, wherein the second similarity criterion is more relaxed.

2. The method according to claim 1 comprising repeating the steps of receiving, determining and performing for at least one other current segment of the video stream.

3. The method according to claim 1 wherein each face signature is associated with a time stamp indicative of a time in which the face appeared in the video stream; wherein the method comprises terminating an appearance of a face after a lapse of a predefined time gap from a last time in which the face appeared in the video stream.

4. The method according to claim 3 comprising erasing face signatures of deleted appearances.

5. The method according to claim 1 comprising maintaining up to a predefined number of face signatures per appearance.

6. The method according to claim 1 comprising maintaining per appearance, face signatures associated with the appearance, timing information regarding when a face appeared in the video stream, and an appearance identifier.

7. The method according to claim 1 comprising associating up to a single face signature per video stream frame and per appearance.

8. The method according to claim 1, wherein the determining of the relationship between the one or more current face signatures to the one or more previous face signatures comprises searching for a best matching previous face signatures per current face signature.

9. The method according to claim 1 wherein the determining of the relationship comprises determining the relationship between (a) the one or more current face signatures and one or more additional attributes associated with the one or more current face signatures, and (b) the at least one previous face signatures and at least one additional attribute associated with the at least one previous face signature.

10. A non-transitory computer readable medium that stores instructions for:
receiving, by a tracker, one or more current face signatures of one or more faces that appear in a current segment of a video stream;
determining a relationship between at least the one or more current face signatures to at least one or more previous face signatures, each previous face signature is of a face that appeared in at least one previous segment of the video stream;
performing current face signature processing for each current face signature of the one or more current face signatures, the current face signature processing comprises:
allocating the current face signature to an existing appearance of a face represented by the previous face signature when the current face signature and the previous face signature are similar to each other; and
associating the current face signature to a new appearance when the current face signature is not similar to any of the one or more previous face signatures;
wherein the determining of the relationship comprises:
performing a first phase of determining similarities between a current face signature to the one or more previous face signatures, wherein the first phase comprises applying a first similarity criterion between the current face signature and the one or more previous face signatures;
when no previous face signature of the one or more previous face signature is similar, then performing a second phase of determining similarities between (a) the current face signature and at least one additional attribute associated with the current face signature, and (b) the at least one previous face signatures and at least one additional attribute associated with the at least one previous face signature, wherein the second phase comprises applying a second similarity criterion between the current face signature and the one or more previous face signatures, wherein the second similarity criterion is more relaxed.

11. The non-transitory computer readable medium according to claim 10 wherein each face signature is associated with a time stamp indicative of a time in which the face appeared in the video stream; wherein the non-transitory computer readable medium comprises terminating an appearance of a face after a lapse of a predefined time gap from a last time in which the face appeared in the video stream.

12. The non-transitory computer readable medium according to claim 10 that stores instructions for maintaining up to a predefined number of face signatures per appearance.

13. The non-transitory computer readable medium according to claim 10 that stores instructions for maintaining per appearance, face signatures associated with the appearance, timing information regarding when a face appeared in the video stream, and an appearance identifier.

14. The non-transitory computer readable medium according to claim 10 that stores instructions for associating up to a single face signature per video stream frame and per appearance.

15. The non-transitory computer readable medium according to claim 10, wherein the determining of the relationship between the one or more current face signatures to the one or more previous face signatures comprises searching for a best matching previous face signatures per current face signature.

16. The non-transitory computer readable medium according to claim 10 wherein the determining of the relationship comprises determining the relationship between (a) the one or more current face signatures and one or more additional attributes associated with the one or more current face signatures, and (b) the at least one previous face signatures and at least one additional attribute associated with the at least one previous face signature.

17. A computerized system comprising a processor that is configured to:
obtain, by a tracker, one or more current face signatures of one or more faces that appear in a current segment of a video stream;
determine a relationship between at least the one or more current face signatures to at least one or more previous face signatures, each previous face signature is of a face that appeared in at least one previous segment of the video stream;
perform current face signature processing for each current face signature of the one or more current face signatures, the current face signature processing comprises:
allocate the current face signature to an existing appearance of a face represented by the previous face signature when the current face signature and the previous face signature are similar to each other; and
associate the current face signature to a new appearance when the current face signature is not similar to any of the one or more previous face signatures;
wherein the processor is configured to determine the relationship by:
performing a first phase of determining similarities between a current face signature to the one or more previous face signatures, wherein the first phase comprises applying a first similarity criterion between the current face signature and the one or more previous face signatures;

when no previous face signature of the one or more previous face signature is similar, then performing a second phase of determining similarities between (a) the current face signature and at least one additional attribute associated with the current face signature, and (b) the at least one previous face signatures and at least one additional attribute associated with the at least one previous face signature, wherein the second phase comprises applying a second similarity criterion between the current face signature and the one or more previous face signatures, wherein the second similarity criterion is more relaxed.

* * * * *